United States Patent
Sui et al.

(10) Patent No.: US 12,464,495 B2
(45) Date of Patent: Nov. 4, 2025

(54) METHOD FOR INCREASING PAGING RESPONSE SPEED OF TERMINAL AND TERMINAL

(71) Applicant: Honor Device Co., Ltd., Shenzhen (CN)

(72) Inventors: Feifei Sui, Shenzhen (CN); Lingshuai Kong, Shenzhen (CN); Fan Yang, Shenzhen (CN); Qinbo Yao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 368 days.

(21) Appl. No.: 17/801,472

(22) PCT Filed: Mar. 5, 2021

(86) PCT No.: PCT/CN2021/079306
§ 371 (c)(1),
(2) Date: Aug. 22, 2022

(87) PCT Pub. No.: WO2021/258774
PCT Pub. Date: Dec. 30, 2021

(65) Prior Publication Data
US 2023/0101731 A1    Mar. 30, 2023

(30) Foreign Application Priority Data

Jun. 23, 2020    (CN) .......................... 202010579865.3

(51) Int. Cl.
*H04W 68/02* (2009.01)
*H04W 36/00* (2009.01)
(Continued)

(52) U.S. Cl.
CPC ........... *H04W 68/02* (2013.01); *H04W 76/27* (2018.02); *H04W 36/0064* (2023.05)

(58) Field of Classification Search
None
See application file for complete search history.

(56) References Cited

U.S. PATENT DOCUMENTS

| 10,129,802 | B2 | 11/2018 | Pelletier et al. |
| 10,492,108 | B2 | 11/2019 | Wu |
| (Continued) | | | |

FOREIGN PATENT DOCUMENTS

| CN | 108541034 A | 9/2018 |
| CN | 108617033 A | 10/2018 |
| (Continued) | | |

OTHER PUBLICATIONS

Ericsson, "Enhanced inter-system mobility in RRC_INACTIVE in spotty NR coverage", 3GPP TSG-RAN WG2#107, R2-1910690, Revision of R2-1906614, Prague, Czech Republic, Aug. 26-30, 2019, 19 pages.
(Continued)

*Primary Examiner* — Kenneth B Wells
(74) *Attorney, Agent, or Firm* — Rimon PC

(57) ABSTRACT

A method for improving a paging response speed of a user equipment (UE), includes: camping, by the UE on a first cell of a first network, the UE being in an RRC connected state; when a first preset condition is met, sending, by an access network device, a first message to the UE, the first message being used to indicate the UE to enter an RRC inactive state; recording, by the access network device, that the UE is in an RRC inactive state; and in response to the first message that is received, entering, by the UE, the RRC inactive state; and when a second preset condition is met, camping, by the UE, on a second cell of the first network, where the UE is in an RRC inactive state, and the first cell and the second cell are the same or different.

12 Claims, 9 Drawing Sheets

(51) Int. Cl.
*H04W 36/08* (2009.01)
*H04W 36/14* (2009.01)
*H04W 76/27* (2018.01)

(56) References Cited

U.S. PATENT DOCUMENTS

| | | | |
|---|---|---|---|
| 10,952,275 B2 | 3/2021 | Zhang et al. | |
| 11,191,020 B2* | 11/2021 | Chen | H04W 52/0235 |
| 11,240,866 B2 | 2/2022 | Zhang et al. | |
| 11,265,963 B2 | 3/2022 | Liu et al. | |
| 11,540,250 B2 | 12/2022 | Hwang et al. | |
| 2018/0139778 A1* | 5/2018 | Chou | H04W 76/27 |
| 2018/0234838 A1 | 8/2018 | Mildh et al. | |
| 2018/0255484 A1 | 9/2018 | Wu | |
| 2019/0141669 A1 | 5/2019 | Hong et al. | |
| 2019/0342832 A1* | 11/2019 | Zhang | H04W 76/27 |
| 2019/0349833 A1* | 11/2019 | Peng | H04W 36/322 |
| 2020/0045593 A1 | 2/2020 | Jung et al. | |
| 2020/0045669 A1 | 2/2020 | Hwang et al. | |
| 2020/0120592 A1* | 4/2020 | Geng | H04W 48/20 |
| 2020/0163133 A1* | 5/2020 | Yang | H04W 76/19 |
| 2020/0187154 A1* | 6/2020 | Li | H04W 76/27 |
| 2020/0288425 A1* | 9/2020 | Jiang | H04W 60/04 |
| 2020/0344691 A1* | 10/2020 | Liu | H04W 52/028 |
| 2020/0351974 A1* | 11/2020 | Zhang | H04W 12/02 |
| 2020/0374968 A1* | 11/2020 | Sun | H04L 5/00 |
| 2021/0044956 A1* | 2/2021 | Kim | H04L 1/1854 |
| 2021/0120624 A1* | 4/2021 | Ying | H04W 76/34 |
| 2021/0337481 A1* | 10/2021 | Goel | H04W 52/0229 |
| 2022/0159518 A1 | 5/2022 | Da et al. | |
| 2022/0174760 A1* | 6/2022 | Xu | H04W 76/30 |
| 2022/0279619 A1* | 9/2022 | Wu | H04W 12/106 |
| 2022/0417985 A1* | 12/2022 | Chen | H04W 74/085 |
| 2023/0104628 A1* | 4/2023 | Tao | H04W 8/02 370/329 |
| 2023/0114120 A1* | 4/2023 | You | H04W 28/0278 370/328 |

FOREIGN PATENT DOCUMENTS

| | | |
|---|---|---|
| EP | 3370476 A1 | 9/2018 |
| RU | 2712427 C1 | 1/2020 |
| RU | 2018144025 A | 6/2020 |
| WO | 2015085273 A1 | 6/2015 |
| WO | 2019213822 A1 | 11/2019 |
| WO | 2020032533 A1 | 2/2020 |
| WO | 2020067944 A1 | 4/2020 |

OTHER PUBLICATIONS

Ericsson, "RRC_INACTIVE battery consumption improvements in spotty NR coverage", 3GPP TSG-RAN WG2#106, R2-1906614, Revision of R2-1904154, Reno, USA, May 13-17, 2019, 19 pages.

Ericsson, "Open issues for camping procedure", 3GPP TSG-RAN WG2 #101bis, Tdoc R2-1804728, Sanya, China, Apr. 16-20, 2018, 11 pages.

3GPP TS 38.300 V15.7.0 (Sep. 2019), 3rd Generation Partnership Project; Technical Specification Group Radio Access Network; NR; NR and NG-RAN Overall Description; Stage 2 (Release 15), total 99 pages.

Qualcomm Incorporated, "UE mobility while in RRC inactive mode—SA2 aspects", SA WG2 Meeting #119, S2-170917 (was S2-17xxxx), Feb. 13-17, 2017, Dubrovnik, Croatia, 6 pages.

* cited by examiner

METHOD FOR INCREASING PAGING RESPONSE SPEED OF TERMINAL AND TERMINAL

CROSS-REFERENCE TO RELATED APPLICATIONS

This application claims priority to Chinese Patent Application No. 202010579865.3, filed with the China National Intellectual Property Administration on Jun. 23, 2020 and entitled "METHOD FOR INCREASING PAGING RESPONSE SPEED OF TERMINAL AND TERMINAL", which is hereby incorporated by reference in its entirety.

TECHNICAL FIELD

This application relates to the field of terminal technologies, and in particular, to a method for increasing a paging response speed of a terminal and a terminal.

BACKGROUND

In new radio (New Radio, NR) systems, to reduce signaling overhead and power consumption of user equipment, a state between a radio resource control (RRC) idle state (that is, RRC_IDLE state) and an RRC connected state (that is, RRC_CONNECT state), that is, an RRC inactive state (that is, RRC_INACTIVE state), is introduced.

When the UE is in the RRC_INACTIVE state, from the perspective of a core network (CoreNetwork, CN), the UE keeps a connection management connected state (CM-CONNECTED) with respect to the core network. In this case, a gNB to which the UE attached last time stores a UE context and an NG connection with an access and mobility management function (access and mobility management function, AMF)/user plane function (user plane function, UPF). The gNB to which the UE attached last time belongs to a 5G access network (NG-RAN). Therefore, when the UE switches from the RRC_INACTIVE state to the RRC_CONNECT state, only a connection between the UE and the gNB needs to be resumed, without involving the core network, so that signaling between the UE and the CN can be significantly reduced.

Like in the RRC_IDLE state, the UE has low power consumption when the UE is in the RRC_INACTIVE state. However, it should be noted that, when the UE is in the RRC_IDLE state, the network side stores a tracking area identity (Tracking Area Identity, TAI) of the UE, but does not store an identifier of a serving cell of the UE, so when the network side needs to deliver service data to the UE, the network side needs to deliver CN paging (CN Paging) to search for the UE in a TA. Likewise, when the UE is in the RRC_INACTIVE state, the NG-RAN stores an identifier of a radio access network-based notification area (RAN-based notification area, RNA) of the UE, but does not store an identifier of a serving cell of the UE. When the network side needs to deliver service data to the UE, the network side first delivers radio access network (radio access network, RAN) paging (RAN Paging) by using the NG-RAN, to search for the UE in an RNA. The RNA is included in the TA, meaning that the RNA is smaller than the TA.

In some scenarios, an actual state of the UE may be inconsistent with the state of the UE recorded by the network side. For example, the state of the UE recorded by the network side is the RRC_INACTIVE state, but the UE may camp on an NR cell again after detaching from the network or reselecting another system, and switch to the RRC_IDLE state. When downlink data needs to be sent to the UE, based on the recorded state of the UE (the RRC_INACTIVE state), the network side needs to first deliver RAN Paging by using the NG-RAN. Because the UE is very likely to stay outside the RNA of the RAN Paging, the UE may not respond to the RAN Paging. The network side sends CN Paging only after RAN Paging delivery by the NG-RAN has timed out or a preset quantity of retries have been made. Then, the UE can switch from the RRC_IDLE state to the RRC_CONNECT state in response to the CN Paging and receive the data delivered by the network side. Therefore, when the actual state of the UE is inconsistent with the state of the UE recorded by the network side, the UE responds slowly to the paging of the network side, resulting in poor user experience.

SUMMARY

This application provides a method for increasing a paging response speed of a terminal and a terminal, which can avoid inconsistency between a state of the UE and a state of the UE that is stored by a network side, and increase a response speed of the terminal to paging of the network side.

To implement the foregoing objectives, the embodiments of this application provide the following technical solutions.

According to a first aspect, a method for increasing a paging response speed of the UE is provided. The method includes: camping, by user equipment UE, on a first cell of a first network, where the UE is in an RRC connected state; when a first preset condition is met, sending, by an access network device, a first message to the UE, where the first message is used to indicate the UE to enter an RRC inactive state; recording, by the access network device, that the UE is in the RRC inactive state; and in response to the first message that is received, entering, by the UE, the RRC inactive state; and when a second preset condition is met, camping, by the UE, on a second cell of the first network, where the UE is in the RRC inactive state, and the first cell and the second cell are the same or different.

For example, the first preset condition is that no data transmission is detected between the UE and an access network. For example, the second preset condition is: it is determined that a signal of the first cell does not meet a camping condition; or the UE is restarted; or the UE enables an aeroplane mode and then disables the aeroplane mode.

That means, after the access network device indicates the UE to enter the RRC inactive state, the UE does not automatically enter an RRC idle state, or immediately enters the RRC inactive state after entering the RRC idle state. In this way, the actual state of the UE is consistent with the state of the UE recorded by the access network device. Then, when the access network device initiates RAN paging based on the recorded state of the UE, the UE can also respond rapidly. This avoids that when the access network device initiates RAN paging based on the recorded state of the UE, the UE has to wait to respond until CN paging is initiated after timeout or a preset quantity of retries. Therefore, the method provided in the embodiments of this application helps increase the paging response speed of the UE and improve user experience.

In a possible implementation, the camping, by the UE, on a second cell of the first network when a second preset condition is met, where the UE is in the RRC inactive state, includes: after the second preset condition is met, camping, by the UE, first on a third cell of a second network and then on the second cell of the first network, where the UE is in the RRC inactive state.

In the conventional art, when the UE detaches from the first cell of the first network and camps on the third cell of the second network, the UE automatically enters the RRC idle state. When the UE camps on the second cell of the first network again, the UE is still in the RRC idle state. However, in the embodiments of this application, when the UE camps on the second cell of the first network again, the UE is in the RRC inactive state that is consistent with the state of the UE recorded by the access network device at this time.

In a possible implementation, the camping, by the UE, on a second cell of the first network when a second preset condition is met, where the UE is in the RRC inactive state, further includes: when the UE determines that a signal of the first cell meets cell reselection criteria, reselecting, by the UE, a third cell of a second network first and then the second cell of the first network, where the UE is in the RRC inactive state, and a network type of the second network is different from a network type of the first network.

In the conventional art, when the UE reselects the third cell of the second network, the UE automatically enters the RRC idle state. When the UE camps on the second cell of the first network again, the UE is still in the RRC idle state. However, in the embodiments of this application, when the UE camps on the second cell of the first network again, the UE is in the RRC inactive state that is consistent with the state of the UE recorded by the access network device at this time.

In a possible implementation, the camping, by the UE, on a second cell of the first network when a second preset condition is met, where the UE is in the RRC inactive state, includes: when the second preset condition is met, camping, by the UE, on the second cell of the first network, where the UE does not enter an RRC idle state; or when the second preset condition is met, camping, by the UE, on the second cell of the first network, and entering an RRC idle state and then the RRC inactive state. In this way, two methods for keeping the UE in the RRC inactive state are provided.

In a possible implementation, after the UE camps on the second cell of the first network and the UE is in the RRC inactive state, the method further includes: in response to first RAN paging that is sent by the access network device and that is received by the UE, resuming, by the UE, an RRC connection to the access network device, and switching from the RRC inactive state to the RRC connected state.

In the RRC inactive state, the UE can rapidly respond to the first RAN paging. However, in the conventional art, after automatically entering the RRC idle state, the UE cannot respond to the first RAN paging until CN paging is sent by the network side. Therefore, the embodiments of this application increase the paging response speed of the UE.

In a possible implementation, the method further includes: when the UE camps on the second cell of the first network and the UE is in the RRC inactive state, sending, by the UE, a registration request to the access network device; and in response to a registration success response that is received from the access network device, deleting, by the UE, a UE context of the UE in the RRC inactive state, and entering the RRC idle state.

In other words, when the UE is in the RRC inactive state on the first network, after receiving a response indicating that the UE successfully registers with the first network again, the UE may not stay in the RRC inactive state but enter the RRC idle state. This provides a method for enabling the UE to exit the RRC inactive state on the first network.

In a possible implementation, the method further includes: when the UE camps on the second cell of the first network and the UE is in the RRC inactive state, receiving, by the UE, a second message that is sent by the access network device, where the second message is used to indicate the UE to enter the RRC idle state; and deleting, by the UE, the UE context of the UE in the RRC inactive state, and switching to the RRC idle state.

In other words, when the UE is in the RRC inactive state on the first network, after receiving from the network side an indication for entering the RRC idle state, the UE may not stay in the RRC inactive state but enter the RRC idle state. This provides another method for enabling the UE to exit the RRC inactive state on the first network.

In a possible implementation, an indication for entering the RRC idle state includes release signaling and a core network paging, where the release signaling does not include a suspend configuration.

In a possible implementation, the method further includes: when the UE camps on the second cell of the first network and the UE is in the RRC inactive state, receiving, by the UE, a user operation; sending, by the UE, an RRC connection resume request to the access network device; switching, by the UE, from the RRC inactive state to the RRC connected state; and sending, by the UE, uplink data to the access network device.

In other words, when the UE is in the RRC inactive state on the first network, after receiving a user indication for entering the RRC connected state, the UE may not stay in the RRC inactive state but enter the RRC connected state. This provides still another method for enabling the UE to exit the RRC inactive state on the first network.

According to a second aspect, a method for increasing a paging response speed of UE is provided, including: camping, by user equipment UE, on a first cell of a first network, where the UE is in an RRC connected state; in response to an indication for an RRC inactive state that is received from an access network device, entering, by the UE, the RRC inactive state; and when a preset condition is met, camping, by the UE, on a second cell of the first network, where the UE is in the RRC inactive state, and the first cell and the second cell are the same or different.

In a possible implementation, the camping, by the UE, on a second cell of the first network when a preset condition is met, where the UE is in the RRC inactive state, includes: after the preset condition is met, camping, by the UE, first on a third cell of a second network and then on the second cell of the first network, where the UE is in the RRC inactive state.

In a possible implementation, the preset condition includes: the UE determines that a signal of the first cell does not meet a camping condition; or the UE is restarted; or the UE enables an aeroplane mode and then disables the aeroplane mode.

In a possible implementation, the camping, by the UE, on a second cell of the first network when a preset condition is met, where the UE is in the RRC inactive state, further includes: when the UE determines that a signal of the first cell meets cell reselection criteria, reselecting, by the UE, a third cell of a second network first and then the second cell of the first network, where the UE is in the RRC inactive state, and a network type of the second network is different from a network type of the first network.

In a possible implementation, the camping, by the UE, on a second cell of the first network when a preset condition is met, where the UE is in the RRC inactive state, includes: when the preset condition is met, camping, by the UE, on the second cell of the first network, where the UE does not enter an RRC idle state; or when the preset condition is met, camping, by the UE, on the second cell of the first network, and entering an RRC idle state and then the RRC inactive state.

In a possible implementation, after the UE camps on the second cell of the first network and the UE is in the RRC inactive state, the method further includes: in response to first RAN paging that is sent by the access network device and that is received by the UE, resuming, by the UE, an RRC connection to the access network device, and switching from the RRC inactive state to the RRC connected state.

In a possible implementation, the method further includes: when the UE camps on the second cell of the first network and the UE is in the RRC inactive state, sending, by the UE, a registration request to the access network device; and in response to a registration success response that is received from the access network device, deleting, by the UE, a UE context of the UE in the RRC inactive state, and entering the RRC idle state.

In a possible implementation, the method further includes: when the UE camps on the second cell of the first network and the UE is in the RRC inactive state, receiving, by the UE, a second message that is sent by the access network device, where the second message is used to indicate the UE to enter the RRC idle state; and deleting, by the UE, the UE context of the UE in the RRC inactive state, and switching to the RRC idle state.

In a possible implementation, an indication for entering the RRC idle state includes release signaling and a core network paging, where the release signaling does not include a suspend configuration.

In a possible implementation, the method further includes: when the UE camps on the second cell of the first network and the UE is in the RRC inactive state, receiving, by the UE, a user operation; sending, by the UE, an RRC connection resume request to the access network device; switching, by the UE, from the RRC inactive state to the RRC connected state; and sending, by the UE, uplink data to the access network device.

According to a third aspect, a communications system is provided, including an access network device and user equipment UE, where the UE is configured to camp on a first cell of a first network, where the UE is in an RRC connected state; the access network device is configured to: when a first preset condition is met, send a first message to the UE, where the first message is used to indicate the UE to enter an RRC inactive state; and record that the UE is in the RRC inactive state; and the UE is further configured to: in response to the first message that is received, enter the RRC inactive state; and when a second preset condition is met, camp on a second cell of the first network, where the UE is in the RRC inactive state, and the first cell and the second cell are the same or different.

In a possible implementation, the camping, by the UE, on a second cell of the first network when a second preset condition is met, where the UE is in the RRC inactive state, includes: after the second preset condition is met, camping, by the UE, first on a third cell of a second network and then on the second cell of the first network, where the UE is in the RRC inactive state.

In a possible implementation, the second preset condition includes: the UE determines that a signal of the first cell does not meet a camping condition; or the UE is restarted; or the UE enables an aeroplane mode and then disables the aeroplane mode.

In a possible implementation, the camping, by the UE, on a second cell of the first network when a second preset condition is met, where the UE is in the RRC inactive state, further includes: when the UE determines that a signal of the first cell meets cell reselection criteria, reselecting, by the UE, a third cell of a second network first and then the second cell of the first network, where the UE is in the RRC inactive state, and a network type of the second network is different from a network type of the first network.

In a possible implementation, the camping, by the UE, on a second cell of the first network when a second preset condition is met, where the UE is in the RRC inactive state, includes: when the second preset condition is met, camping, by the UE, on the second cell of the first network, where the UE does not enter an RRC idle state; or when the second preset condition is met, camping, by the UE, on the second cell of the first network, and entering an RRC idle state and then the RRC inactive state.

In a possible implementation, the UE is further configured to: in response to first RAN paging that is received from the access network device, resume an RRC connection to the access network device, and switch from the RRC inactive state to the RRC connected state.

According to a fourth aspect, a computer-readable storage medium is provided, including a computer instruction, where when the computer instruction runs on UE, the UE is caused to perform the method described in the foregoing aspects and any possible implementation thereof.

According to a fifth aspect, a computer program product is provided, where when the computer program product runs on a computer, the computer is caused to perform the method described in the foregoing aspects and any possible implementation thereof.

According to a sixth aspect, a system on chip is provided, including a processor, where when an instruction is executed by the processor, the processor implements the method described in the foregoing aspects and any possible implementation thereof.

According to a seventh aspect, an apparatus is provided, where the apparatus is included in UE, and the apparatus has a function of implementing behavior of the UE in any method of the foregoing aspects and possible implementations. Such function may be implemented by hardware or corresponding software executed by hardware. The hardware or software includes at least one module or unit corresponding to the foregoing function, for example, a receiving module or unit, a sending module or unit, a determining module or unit, and a switching module or unit.

DESCRIPTION OF EMBODIMENTS

In the description of the embodiments of this application, unless otherwise specified, "/" represents the meaning of or. For example, A/B may represent A or B. The term "and/or" in this specification is only an associative relationship for describing associated objects, indicating that three relationships may exist. For example, A and/or B may represent the following three cases: only A, both A and B, or only B.

In the following, the terms "first" and "second" are merely used for description and should not be construed as indicating or implying relative importance or implicitly indicating the number of the technical features indicated. Therefore, the features defined as "first" and "second" may expressly or implicitly include one or more such features. In the descriptions of the embodiments of this application, unless otherwise specified, "a plurality of" means at least two.

In the embodiments of this application, the words such as "example" or "for example" are used for illustration or description. Any example or design solution described as "example" or "for example" in the embodiments of this application shall not be interpreted as being more preferable or advantageous than other embodiments or design solutions. Specifically, the words such as "example" or "for example" are intended to present related concepts in a specific way.

For example, a method provided in the embodiments of this application is applicable to a 5G system, an LTE system, or other communications systems that allow UE to switch to an RRC_INACTIVE state. Networks to which the technical solutions provided in this application are applicable are not limited in the embodiments of this application. The following describes the technical solutions provided in the embodiments of this application by using a 5G network as an example.

Figure 1A:
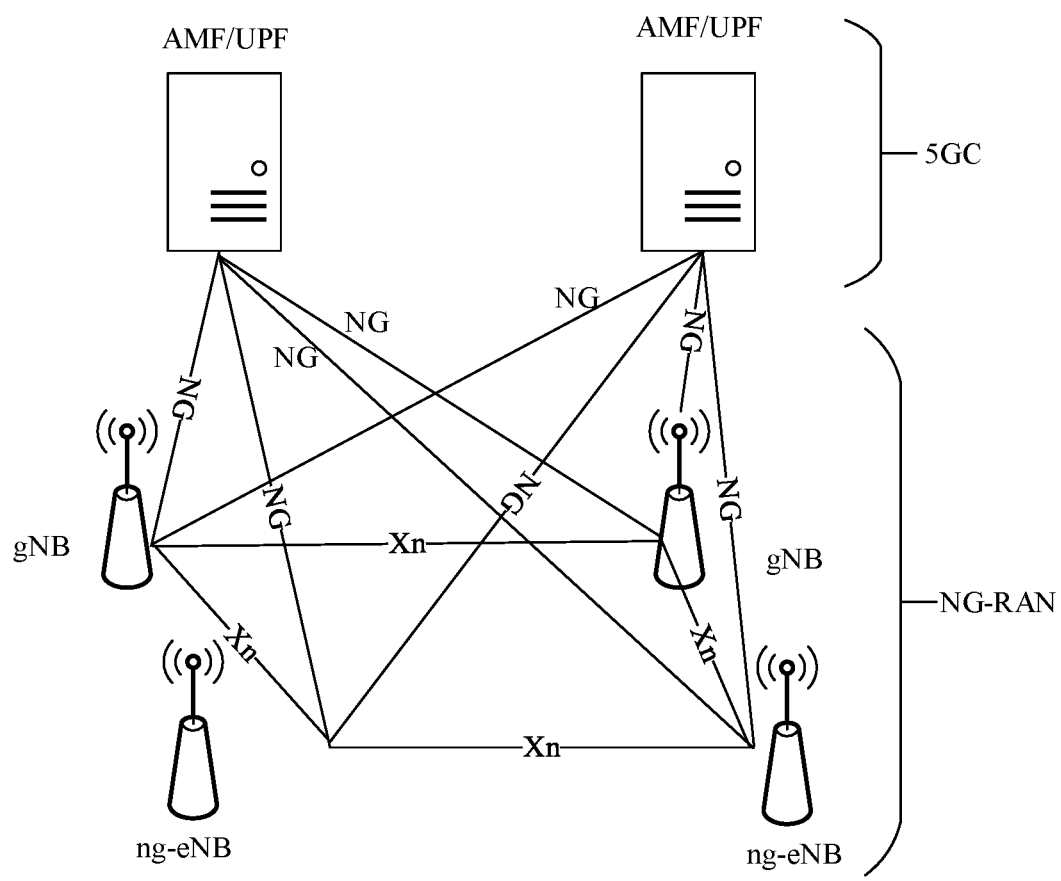
FIG. 1A is a schematic structural diagram of a communications system according to an embodiment of this application.

FIG. 1A is a schematic diagram of an architecture of a 5G network according to an embodiment of this application. The 5G network includes a 5G core network (5GC) and a 5G access network (NG-RAN).

The 5G core network (5G core, 5GC) includes but is not limited to an access and mobility management function (access and mobility management function, AMF)/user plane function (user plane function, UPF). The AMF is responsible for encryption and integrity protection of non-access stratum (Non-access stratum, NAS) messages, and implements functions such as UE registration, attachment, mobility, authentication, and transparent transmission of SMS messages. The UPF, as an intra/inter-system mobility anchor point, is responsible for packet routing and forwarding, data packet inspection, and policy rule implementation of a user plane part; as an uplink classifier, supports routing of flows to a data network; and as a branch point, supports a multi-host protocol data unit (protocol data unit, PDU) session, user-plane QoS processing, downlink packet buffering, downlink data notification triggering, and the like.

The 5G access network (NG-RAN) includes a device with a wireless transceiving function or a chip (system on ship) or component or assembly mountable on the device. The NG-RAN may include a gNB or a transmission point (TRP or TP) in 5G (for example, an NR system), and one or one group (including a plurality of antenna panels) of antenna panels of a base station in a 5G system, or may be a network node that forms a gNB or a transmission point, for example, a baseband unit (BBU), a distributed unit (distributed unit, DU), or a road side unit (road side unit, RSU) with a base station function. The gNB provides an end node over an NR user plane and control plane protocol to UE and is connected to the 5GC by using an NG interface.

In some examples, the NG-RAN may further include an ng-eNB. Under a non-standalone (NSA) networking architecture of Option 4, a 4G base station needs to be upgraded to support eLTE and interwork with the 5G core network. The upgraded 4G base station is called an ng-eNB. Because of the dual connectivity (DC) of the 5G NR (N) and the 4G eNB (E), with the 5G NR as an anchor point, such architecture is called NE-DC (NR eNB Dual Connection). Likewise, under a non-standalone (NSA) networking architecture of Option 7, a 4G base station interworks with the 5G core network. The upgraded 4G base station is also called an ng-eNB. However, with the anchor point on the ng-eNB, such architecture is called NGEN-DC (NG-Enb NR Dual Connection). The ng-eNB provides an end node over an E-UTRA user plane and control plane protocol to the UE and is connected to the 5GC by using an NG interface.

The base stations (a gNB, an ng-eNB, and the like) in the NG-RAN may be connected to each other by using an Xn interface, to implement communication.

For ease of understanding, a state machine (state machine) and state switching of the UE in the NR system are described first. The state machine defines behavior and states of the UE in different events.

Figure 1B:
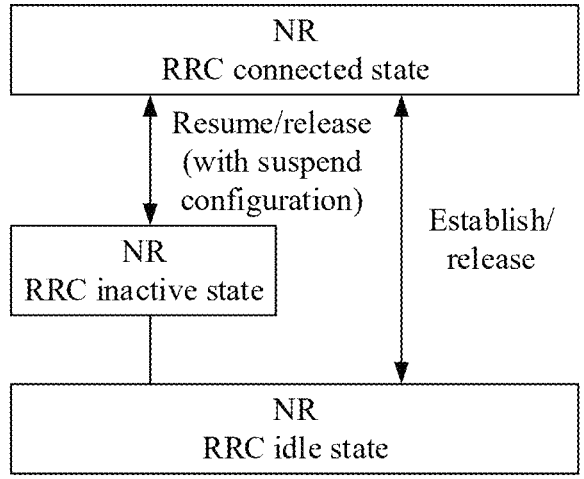
FIG. 1B is a schematic diagram illustrating switching between different state machines of UE in an NR system in the prior art.

As shown in FIG. 1B, the state machine of the UE in the NR system includes an RRC connected state (that is, RRC_CONNECT state), an RRC inactive state (that is, RRC_INACTIVE state or inactive state), and an RRC idle state (that is, RRC_IDLE state).

For example, after startup, the UE performs cell search, selects an appropriate cell, and camps on the selected cell. In this case, the UE is in the RRC_IDLE state. At this time or later, the UE sends an RRC connection establishment (establish) request to the network side and performs registration. After the UE establishes an RRC connection to the network side, the UE switches from the RRC_IDLE state to the RRC_CONNECT state. In this case, the UE may communicate with the network side over the RRC connection, for example, transmitting control plane data and/or user plane data. If no data is transmitted between the UE and the network side within a period of time (for example, time period 1), the network side may deliver release (release) signaling to directly release a connection between the core network and the UE. Then, the UE switches from the RRC_CONNECT state to the RRC_IDLE state. In this case, the UE detaches from the access network, and the access network is disconnected from the core network.

Alternatively, if no data is transmitted between the UE and the network side within a period of time (for example, time period 1), the network side may send release signaling carrying a suspend (suspend) configuration, to directly release a connection between the access network and the UE. Then, the UE switches from the RRC_CONNECT state to the RRC_INACTIVE state. In this case, the access network to which the UE attached last time is still connected to the core network. When data needs to be transmitted between the UE and the network side, the connection between the UE and the access network can be rapidly resumed (resume). That is, the UE can rapidly switch from the RRC_INACTIVE state back to the RRC_CONNECT state.

Alternatively, if still no data is transmitted between the UE and the network side within a period of time (for example, time period 2) after the UE stays in the RRC_INACTIVE state, the network side can completely release a connection between the core network and the access network. Then, the UE switches from the RRC_INACTIVE state to the RRC_IDLE state. In this case, when the UE is in the RRC_IDLE state, if data needs to be transmitted between the UE and the network side, the UE needs to reestablish a connection to the network side.

In some embodiments, when a predefined condition is met (for example, no data receiving or sending is performed, or an aeroplane mode is enabled), the UE can also actively initiate an RRC release and the like.

Figure 1C:
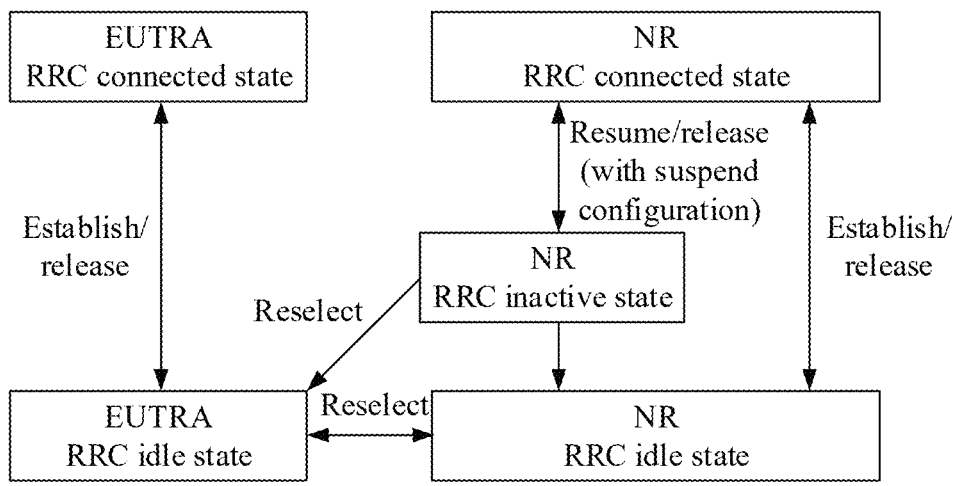
FIG. 1C is a schematic diagram illustrating switching between different state machines in an NR system and an LTE system in the prior art.

It can be learned that in the NR system, the UE can switch between the RRC_INACTIVE state, the RRC_INACTIVE state, and RRC_IDLE state. In addition, the UE may also interact with another system (for example, LTE/UMTS/GSM) to change the RRC state. FIG. 1C is a schematic diagram illustrating interactive state switching between an NR system and an LTE system. For example, in an RRC_INACTIVE or RRC_IDLE state of NR, the UE may reselect LTE, and switches to an RRC_IDLE state of LTE. In the RRC_IDLE state of LTE, the UE can switch to the RRC_IDLE state of NR through reselection, but not to the RRC_INACTIVE state of NR.

In some scenarios, the state of the UE recorded by the network side may be inconsistent with the actual state of the UE. For example, when the network side indicates the UE to enter the RRC_INACTIVE state, the network side records that the UE is in the RRC_INACTIVE state, and the UE enters the RRC_INACTIVE state according to an indication of the network side. When the UE detects that a current camping cell does not meet a camping condition, the UE detaches from the network. The UE searches for a network again, finds another cell meeting the camping condition, and camps on it. In this case, the UE switches to the RRC_IDLE state. It should be noted that at this time, the state of the UE recorded by the network side remains unchanged and is still the RRC_INACTIVE state.

For example, when the UE is in the NR system, if no data is transmitted between the UE and the network side within a period of time, the network side indicates the UE to enter the RRC_INACTIVE state. When the UE is in the RRC_INACTIVE state, if a signal of a current serving cell does not meet a camping condition, the UE detaches from the network. The UE performs cell search. If a cell that meets the camping condition and that is found through cell search is an LTE cell of LTE, the UE camps on the LTE cell. In this case, the UE switches to the RRC_IDLE state of LTE. However, the network side of NR still records that the UE is in the RRC_INACTIVE state of NR. In some examples, the UE successfully registers with the cell of LTE. After that, if data needs to be transmitted, the UE establishes an RRC connection to an LTE network, and switches from the RRC_IDLE state of LTE to the RRC_CONNECT state of LTE. In some other examples, if the UE does not register with the cell of LTE successfully or the cell of LTE does not meet the camping condition, the UE performs cell search again, finds a cell of NR, and camps on the cell of NR. In this case, the UE enters the RRC_IDLE state of NR. However, the network side of NR records that the UE is in the RRC_INACTIVE state.

Alternatively, when the UE is in the RRC_INACTIVE state and the UE detects that a current camping cell meets cell reselection criteria, the UE reselects a cell. The UE may reselect a cell of another system (for example, an LTE system), but reselects the cell of the NR system again due to unsuccessful registration with the another system. When the UE reselects the cell of the another system, the UE switches from the RRC_INACTIVE state of NR to an RRC_IDLE state of the another system. When the UE reselects the cell of the NR system again, the UE switches from the RRC_IDLE state of the another system back to the RRC_IDLE state of the NR system. It should be noted that at this time, the state of the UE recorded by the network side remains unchanged and is still the RRC_INACTIVE state.

As described above, when the state of the UE recorded by the network side is different from the actual state of the UE, the UE responds to the paging of the network side slowly, resulting in poor user experience. Therefore, in the method for increasing a paging success rate of UE provided in the embodiments of this application, in the RRC_INACTIVE state, the UE does not automatically enter the RRC_IDLE state but stays in the RRC_INACTIVE state in a specific scenario, or automatically enters the RRC_IDLE state and then rapidly enters the RRC_INACTIVE state in a specific scenario. The specific scenario includes but is not limited to: the UE in the RRC_INACTIVE state detaches from a network and then camps on a cell of an original system again; or the UE in the RRC_INACTIVE state detaches from a network, camps on a cell of another system, and then camps on a cell of an original system again when the UE does not register with or does not successfully register with the cell of the another system; or the UE in the RRC_INACTIVE state reselects a cell of another system, but camps on a cell of an original system again when the UE does not register with or does not successfully register with the cell of the another system. In this way, the method provided in the embodiments of this application keeps the actual state of the UE consistent with the state of the UE recorded by the network side, increasing the response speed of the UE to paging of the network side and improving user experience.

For example, in the embodiments of this application, the UE may be, for example, a mobile phone, a tablet computer, a personal computer (personal computer, PC), a personal digital assistant (personal digital assistant, PDA), a smartwatch, a netbook, a wearable device, an augmented reality (augmented reality, AR) device, a virtual reality (virtual reality, VR) device, an in-vehicle device, a smart screen, an intelligent vehicle, an intelligent sound box, a robot, or the like. The specific form of the UE is not specifically limited in this application.

Figure 2:
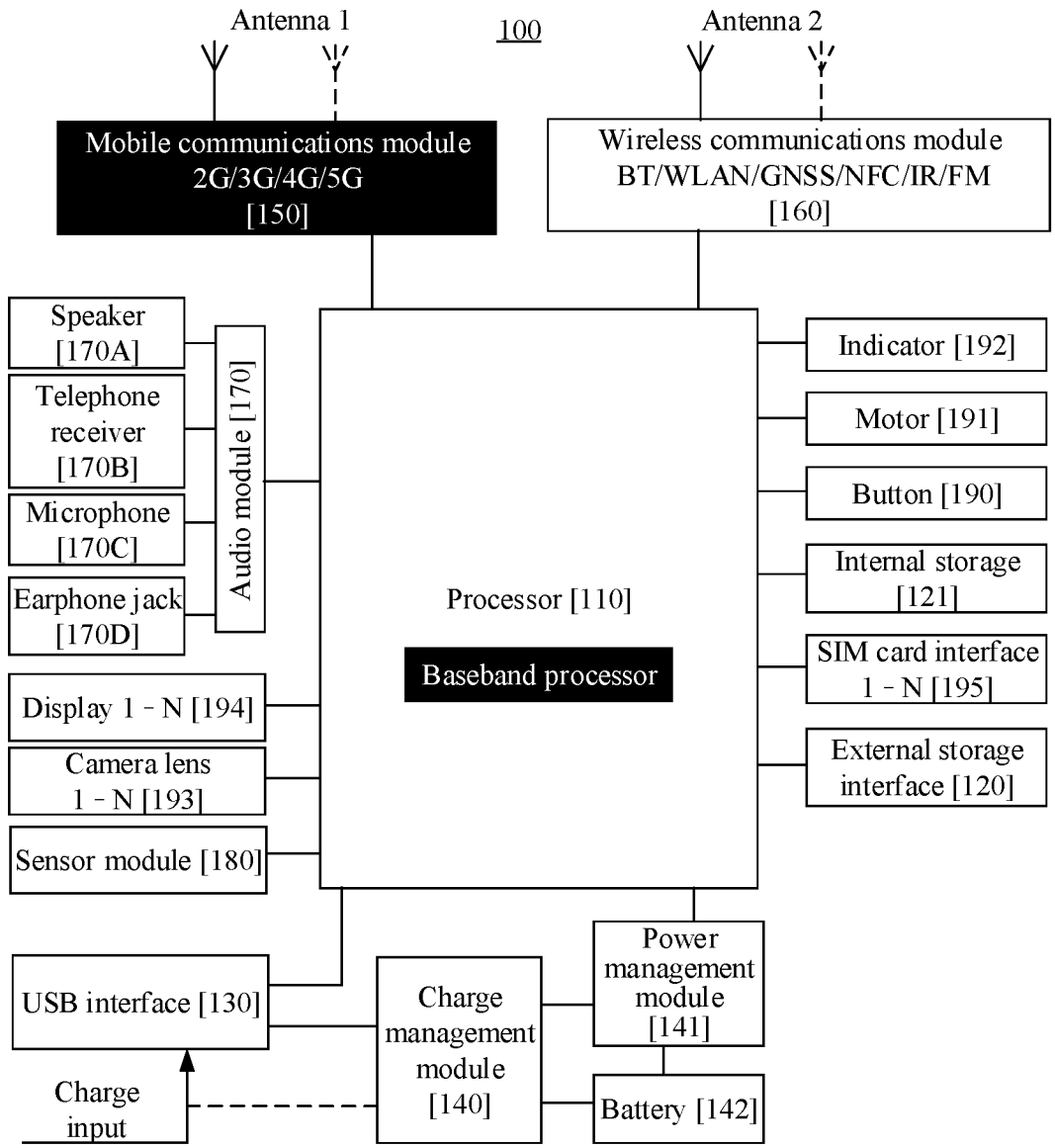
FIG. 2 is a schematic structural diagram of an electronic device according to an embodiment of this application.

FIG. 2 is a schematic structural diagram of UE 100.

The UE 100 may include a processor 110, an external storage interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera lens 193, a display 194, a subscriber identification module (subscriber identification module, SIM) card interface 195, and the like. It can be understood that the structure in the embodiments of the present invention does not constitute specific limitations on the UE 100. In some other embodiments of this application, the UE 100 may include more or fewer components than those shown in the figure, some components combined, some components split, or components disposed differently. The component shown in the figure may be implemented in a form of hardware, software, or a combination of hardware and software.

The processor 110 may include one or more processing units. For example, the processor 110 may include an application processor (application processor, AP), a modem processing unit, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be separate devices or may be integrated in one or more processors.

The controller can generate an operation control signal based on an instruction operation code and a time sequence signal to control a fetch instruction and an executable instruction.

A memory may also be disposed in the processor 110 and is configured to store an instruction and data. In some embodiments, the memory in the processor 110 is a cache memory. The memory can store an instruction or data used recently or cyclically by the processor 110. If the instruction or data needs to be used again, the processor 110 can directly call the instruction or data from the memory. This avoids repeated access and reduces wait time of the processor 110, thereby improving efficiency of the system.

It can be understood that an interface connection relationship of the modules shown in FIG. 2 is merely described as an example and does not constitute limitations on the structure of the UE 100. In some other embodiments of this application, the UE 100 may alternatively use an interface connection method different from that in the foregoing embodiment, or a combination of various interface connection methods.

The charge management module 140 is configured to receive a charge input from a charger. The charger may be a wireless charger or a wired charger. In some embodiments of wired charging, the charge management module 140 can receive a charge input of the wired charger by using a USB interface 130. In some embodiments of wireless charging, the charge management module 140 can receive a wireless charge input by using a wireless charging coil of the UE 100. When charging the battery 142, the charge management module 140 can also supply power to the UE by using the power management module 141.

The power management module 141 is configured to be connected to the battery 142, the charge management module 140, and the processor 110. The power management module 141 receives an input from the battery 142 and/or the charge management module 140, and supplies power to the processor 110, the internal memory 121, the display 194, the camera lens 193, the wireless communications module 160, and the like. The power management module 141 can also be configured to monitor parameters such as a battery capacity, a quantity of battery cycles, and a state of health of the battery (leakage and impedance). In some other embodiments, the power management module 141 may be alternatively disposed in the processor 110. In some other embodiments, the power management module 141 and the charge management module 140 may be alternatively disposed in a same device.

A wireless communication function of the UE 100 may be implemented by using the antenna 1, the antenna 2, the mobile communications module 150, the wireless communications module 160, the modem processing unit, the baseband processor, and the like.

The antenna 1 and the antenna 2 are configured to transmit and receive an electromagnetic wave signal. Each antenna in the UE 100 can be configured to cover one or more communication bands. The antenna can also be used for a different purpose, to improve utilization of the antenna. For example, the antenna 1 can be reused as a diversity antenna of a wireless local area network. In some other embodiments, the antenna can be used in combination with a tuning switch.

The mobile communications module 150 can provide wireless communication solutions including 2G/3G/4G/5G that are applied to the UE 100. The mobile communications module 150 may include at least one filter, a switch, a power amplifier, a low noise amplifier (low noise amplifier, LNA), and the like. The mobile communication module 150 can receive an electromagnetic wave by using the antenna 1, perform filtering, amplification, and other processing on the received electromagnetic wave, and transmit the processed electromagnetic wave to the modem processing unit for demodulation. The mobile communications module 150 can also amplify a signal modulated by the modem processing unit, and convert the amplified signal into an electromagnetic wave for radiation by using the antenna 1. In some embodiments, at least a part of functional modules of the mobile communications module 150 may be disposed in the processor 110. In some embodiments, at least a part of functional modules of the mobile communications module 150 and at least a part of modules of the processor 110 may be disposed in a same device.

The modem processing unit may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. The demodulator then transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the telephone receiver 170B, and the like), or displays an image or video by using the display 194. In some embodiments, the modem processing unit may be a separate device. In some other embodiments, the modem processing unit may be independent of the processor 110, and disposed in a same device together with the mobile communications module 150 or another functional module.

The wireless communications module 160 can provide wireless communication solutions that are applied to the UE 100, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), infrared (infrared, IR), and the like. The wireless communications module 160 may be one or more devices that integrate at least one communication processing module. The wireless communications module 160 receives an electromagnetic wave by using the antenna 2, performs frequency modulation and filtering on an electromagnetic wave signal, and transmits the processed signal to the processor 110. The wireless communications module 160 can also receive a to-be-transmitted signal from the processor 110, perform frequency modulation and amplification on the signal, and convert the processed signal into an electromagnetic wave for radiation by using the antenna 2.

In some embodiments, the antenna 1 of the UE 100 is coupled to the mobile communications module 150, and the antenna 2 is coupled to the wireless communications module 160, so that the UE 100 can communicate with a network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or an IR technology, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

The UE 100 implements a display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs and execute a program instruction to generate or change display information.

The display 194 is configured to display an image, video, or the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like. In some embodiments, the UE 100 may include 1 or N displays 194, where N is a positive integer greater than 1.

The external storage interface 120 can be configured to be connected to an external memory card, for example, a Micro SD card, to expand a storage capability of the UE 100. The external memory card communicates with the processor 110 by using the external storage device interface 120, to implement a data storage function. For example, files such as music and video are stored in the external memory card.

The internal memory 121 can be configured to store computer executable program code, where the executable program code includes an instruction. The internal memory 121 may include a program storage region and a data storage region. The program storage region can store an operating system, an application program required for at least one function (for example, a sound play function and an image play function), and the like. The data storage region can store data (for example, audio data and a phone book) created during use of the UE 100, and the like. In addition, the internal memory 121 may include a high-speed random access memory, and may further include a non-volatile memory, for example, at least one disk memory device, a flash memory device, or a universal flash storage (universal flash storage, UFS). The processor 110 runs an instruction stored by the internal memory 121 and/or an instruction stored by a memory of the processor, to execute various function applications and data processing of the UE 100.

In the embodiments of this application, after receiving the indication of the network side for entering the RRC_INACTIVE state, the processor 110 (which may specifically be the baseband processor) can store, in the internal memory 121, a context (denoted as a first UE context) of the UE entering the RRC_INACTIVE state, so that after detaching from a network/reselecting a cell, the UE stays in the RRC_INACTIVE state based on the stored first UE context. In some examples, after determining that the UE registers with the network side again successfully or receiving the indication (for example, release signaling or CN Paging signaling) of the network side for releasing an RRC connection, the processor 110 (which may specifically be the baseband processor) can delete the first UE context from the internal memory 121.

The UE 100 can implement an audio function by using the audio module 170, the speaker 170A, the telephone receiver 170B, the microphone 170C, the earphone jack 170D, the application processor, and the like, for example, music playing and sound recording.

The audio module 170 is configured to convert digital audio information into an analog audio signal for outputting and convert an analog audio input into a digital audio signal. The audio module 170 can also be configured to encode and decode an audio signal. In some embodiments, the audio module 170 may be disposed in the processor 110, or a part of functional modules of the audio module 170 are disposed in the processor 110.

The speaker 170A, also called a "loudspeaker", is configured to convert an audio electrical signal into a sound signal. A user can listen to music or answer a hands-free call by using the speaker 170A of the UE 100.

The telephone receiver 170B, also called a "receiver", is configured to convert an audio electrical signal into a sound signal. When answering a call or listening to a voice message, a user can listen to the speech by putting the telephone receiver 170B of the UE 100 close to an ear.

The microphone 170C, also called a "mike" and "sound transmitter", is configured to convert a sound signal into an electrical signal. When making a call or sending a voice message, a user can speak close to the microphone 170C, to input a sound signal to the microphone 170C. The UE 100 may be provided with at least one microphone 170C. In some other embodiments, the UE 100 may be provided with two microphones 170C, to implement a denoising function in addition to collection of a sound signal. In some other embodiments, the UE 100 may be alternatively provided with three, four, or more microphones 170C, to collect a sound signal, implement denoising, recognize a sound source, implement a directional sound recording function, and the like.

The earphone jack 170D is configured to be connected to a wired headset. The earphone jack 170D may be a USB interface 130, or may be a 3.5-mm open mobile terminal platform (open mobile terminal platform, OMTP) standard interface, or a cellular telecommunications industry association of the USA (cellular telecommunications industry association of the USA, CTIA) standard interface.

The button 190 includes a power button, a volume button, and the like. The button 190 may be a mechanical button, or a touch button. The UE 100 can receive a button input and generate a button signal input related to user settings and function control of the UE 100.

The motor 191 can generate a vibration prompt. The motor 191 can be used for an incoming call vibration prompt, and can also be used for a touch vibration feedback. For example, different vibration feedback effects may correspond to touch operations on different applications (for example, photographing and audio playing). The motor 191 can also provide different vibration feedback effects corresponding to touch operations on different areas of the display 194. Different vibration feedback effects may alternatively correspond to different application scenarios (for example, time reminder, information reception, alarm clock, and game). Touch vibration feedback effects can also be customized.

The indicator 192 may be an indicator light, can be configured to indicate a charging state and a battery level change, and can also be configured to indicate a message, a missed call, a notification, and the like.

The SIM card interface 195 is configured to be connected to an SIM card. The SIM card may be inserted into the SIM card interface 195 to contact the UE 100, or pulled out of the SIM card interface 195 to separate from the UE 100. The UE 100 can support 1 or N SIM card interfaces, where N is a positive integer greater than 1. The SIM card interface 195 can support a Nano SIM card, a Micro SIM card, a SIM card, and the like. A plurality of cards can be inserted into the same SIM card interface 195 at the same time. The plurality of cards may be of the same type or different types. The SIM card interface 195 can also support different types of SIM cards. The SIM card interface 195 can also support an external memory card. The UE 100 interacts with a network by using a SIM card, to implement functions such as calling and data communication. In some embodiments, the UE 100 uses an eSIM, that is, an embedded SIM card. The eSIM may be embedded in the UE 100 and cannot be separated from the UE 100.

The technical solutions in the following embodiments can all be implemented in the UE 100 with the foregoing hardware architecture. The following describes the technical solutions provided in the embodiments of this application in detail.

For ease of understanding of the technical solutions provided in this application, similarities and differences between the RRC_INACTIVE state and the RRC_CONNECT state and similarities and differences between the RRC_INACTIVE state and the RRC_IDLE state are described first.

1. Similarities and differences between RRC_INACTIVE state and RRC_CONNECT state Similarities: (1) The UE and the NR-RAN both store a UE access stratum (access stratum, AS) context.

(2) A connection to the CN and the NG-RAN on a control plane/user plane has been established. From the perspective of the core network, the UE is in a CM-CONNECT state.

Differences: (1) In the RRC_CONNECT state, the NG-RAN stores an identifier of a serving cell in which the UE is located. In the RRC_INACTIVE state, the NR-RAN does not store the identifier of the serving cell in which the UE is located, but stores an RNA in which the UE is located, so that paging of the UE needs to be performed in the RNA. In addition, the NG-RAN configures a discontinuous reception (discontinuous reception, DRX) cycle used by the UE.

In a DRX mechanism, the UE periodically enters a sleep mode (sleep mode) during which no PDCCH subframe monitoring is performed, and wakes up (wake up) from the sleep mode when monitoring is required, thereby saving power for the UE.

(2) In the RRC_INACTIVE state, selection of a public land mobile network (Public Land Mobile Network, PLMN), cell reselection, a broadcasting system message receiving process, and a RNA related process can be performed.

(3) In the RRC_CONNECT state, uplink/downlink uni-directional transmission, network controlled mobility, measurement, switching, and the like can be performed.

2. Similarities and differences between RRC_INACTIVE state and RRC_IDLE state

Similarities: Selection of a PLMN, cell reselection, and a broadcasting system message receiving process can be performed in both states.

Differences: (1) In the RRC_IDLE state, the CN stores a TA in which the UE is located, but does not store an identifier of a serving cell in which the UE is located, so that the network side pages the UE in the TA (that is, delivers CN Paging).

In the RRC_INACTIVE state, the NR-RAN does not store the identifier of the serving cell in which the UE is located, but stores an RNA in which the UE is located, so that the network side pages the UE in the RNA (that is, delivers RAN Paging).

(2) A DRX cycle in the RRC_IDLE state is configured as UE-specific by an NAS or configured as common by a cell, and a DRX cycle in the RRC_INACTIVE state can be configured in an RRC connection suspend by the NG-RAN.

(3) In the RRC_INACTIVE state, the UE and the NG-RAN both store a UE AS context.

(4) In the RRC_INACTIVE state, a connection to the CN and the NG-RAN on a control plane/user plane has been established.

Figure 3A:
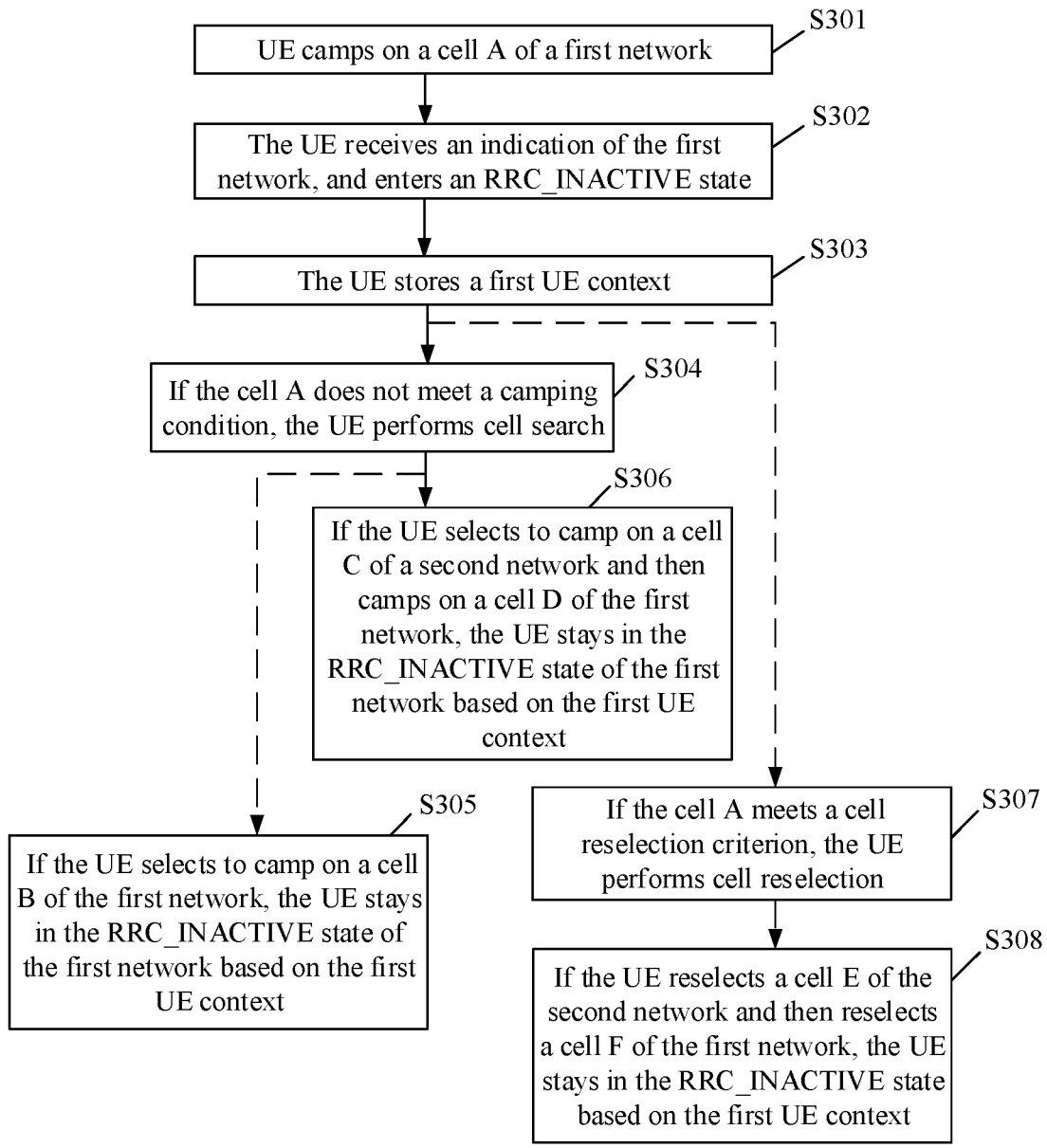
FIG. 3A is a schematic flowchart of a method for increasing a paging response speed of UE according to an embodiment of this application.

FIG. 3A is a flowchart of a method for increasing a paging response speed of UE according to an embodiment of this application. The method specifically includes the following steps.

S301. The UE camps on a cell A of a first network.

The first network is, for example, a 5G system (for example, an NR system), an LTE system (for example, an NB-IoT system), or another communications system that allows the UE to switch to an RRC_INACTIVE state.

S302. The UE receives an indication of the first network, and enters an RRC_INACTIVE state. In this case, the state of the UE recorded by the first network is the RRC_INACTIVE state.

After the UE camps on the first network and succeeds in registration, the UE can request to establish an RRC connection to the first network. After the UE establishes the RRC connection to the first network, data (user plane data/control plane data) can be transmitted through the established RRC connection. In this case, the UE is in an RRC_CONNECT state of the first network. If no data is transmitted between the UE and the first network throughout a first preset time period, the first network can indicate the UE to enter the RRC_INACTIVE state of the first network.

In a specific implementation, a core network device (for example, an AMF) in the first network can have RRC inactive assistance information (RRC_INACTIVE ASSISTANCE INFORMATION) carried in an initial context setup request (INITIAL CONTEXT SETUP REQUEST) message or a UE context modification request (UE CONTEXT MODIFICATION REQUEST) message, and deliver the message to an NG-RAN for use by the NG-RAN to determine whether the UE can enter the RRC_INACTIVE state.

The RRC inactive assistance information includes: a registration region configured for the UE (UE identify index value), a UE-specific DRX (UE specific DRX), a periodic registration update timer (periodic registration update timer), a MICO mode indication (MICO mode indication), a UE id index value, and the like. The UE identity index value is used as a reference for configuring an RAN-based notification area (RAN-based notification area, RNA) of the UE for a gNB. The UE-specific DRX and the UE id index value are used for paging a UE. The periodic registration update timer is used as a reference for configuring an RNA update timer for the gNB. After that, the NG-RAN of the first network can specifically determine, based on a type of the UE, an application of the UE, a network configuration, or the like, when to indicate the UE to enter the RRC_INACTIVE state.

S303. The UE stores a first UE context.

After entering the RRC_INACTIVE state of the first network, the UE stores a current UE context, namely the first UE context, so that it can rapidly restore the RRC_CONNECT state of the first network from the RRC_INACTIVE state of the first network, or stay in the RRC_INACTIVE state of the first network subsequently. The UE context includes but is not limited to a UE AS context, for example, a UE security algorithm capability, a UE aggregate maximum bit rate, a created PDU session information list, an RRC context, a mobility restriction list, and the like. The mobility restriction list includes a UE access barred RAT, a barred TA list, a serving TA list, a PLMN, and an ELPLMN The PDU session information list includes a session IND and type, a selected slice, a session aggregate maximum bit rate, a QoS flow established in the session, and the like.

In addition, after the UE enters the RRC_INACTIVE state of the first network, the NG-RAN, which may specifically be a gNB to which the UE attached last time, stores the UE context and an NG connection between the UE and an AMF/UDP, so that the NG-RAN can rapidly resume the RRC connection, allowing the UE, to rapidly switch from the RRC_INACTIVE state of the first network back to the RRC_CONNECT state of the first network.

In some embodiments of this application, when the UE is in the RRC_INACTIVE state of the first network, if finding that the currently camping cell of the first network does not meet a camping condition, the UE performs cell search. That is, after step S303, step S304 and step S305 are performed, or step S304 and step S306 are performed.

S304. If the cell A does not meet a camping condition, the UE performs cell search.

When the UE is in the RRC_INACTIVE state of the first network, if finding that the currently camping cell A of the first network does not meet the camping condition, the UE detaches from the network and performs cell search. For example, when the UE is carried by a user to an environment with poor signal quality of the first network (for example, an elevator cage or a basement), or the user enables an aeroplane mode by mistake and then disables the aeroplane mode, or the UE is abnormally restarted, if finding that the currently camping cell A of the first network does not meet the camping condition, the UE performs cell search to find a cell meeting a preset condition and camps on the cell.

For example, the determining whether the cell A of the first network meets the camping condition includes the following content:

(1) A PLMN of the cell A is a PLMN selected by the NAS, a PLMN of the cell is a registered PLMN, or a PLMN of the cell is a PLMN in an equivalent PLMN list;

(2) The cell A is not a barred cell;

(3) A tracking area identifier (tracking area identifier, TAI) of the cell A is not a TAI in forbidden tracking areas for roaming (forbidden tracking areas for roaming); and (4) The cell A meets cell selection criteria (cell selection criteria), where the cell selection criteria include: Srxlev>0, and Squal>0, where Srxlev represents a cell selection reception (reception, RX) level value (cell selection RX level value (dB)), and Squal represents a cell selection quality value (cell selection quality value (dB)). For specific calculation methods of Srxlev and Squal, refer to the related art.

S305. If the UE selects to camp on a cell B of the first network, the UE stays in the RRC_INACTIVE state of the first network based on the first UE context.

In the conventional art, the UE finds the cell B of the first network meeting the camping condition, and selects to camp on the cell B, the UE deletes the first UE context and switches from the RRC_INACTIVE state of the first network to the RRC_IDLE state of the first network. However, in this embodiment of this application, after the UE camps on the cell B, the UE does not delete the first UE context (that is, keeps the first UE context), and stays in the RRC_INACTIVE state of the first network based on the first UE context. It should be noted that at this time, the state of the UE recorded by the first network is still the RRC_INACTIVE state.

It should be noted that in this specification, that the UE stays in the RRC_INACTIVE state of the first network based on the first UE context includes: the UE does not enter the RRC_IDLE state and is still in the RRC_INACTIVE state after camping on a new cell (including an original cell); and the UE first enters the RRC_IDLE state and then enters the RRC_INACTIVE state based on the first UE context after camping on the new cell (including the original cell). This is not limited in the embodiments of this application.

Therefore, with the method provided in the embodiments of this application, the actual state of the UE keeps consistent with the state of the UE recorded by the first network side. In this way, when the first network transmits downlink data and the first network performs paging by using RAN Paging, the UE can rapidly respond to the RAN Paging, to rapidly switch from the RRC_INACTIVE state to the RRC_CONNECT state, and receive the downlink data and send uplink data. In addition, when the UE is in the RRC_INACTIVE state, the UE can also respond to a user operation, to actively and rapidly resume the RRC connection, and switch from the RRC_INACTIVE state to the RRC_CONNECT state. However, in the conventional art, when the UE is in the RRC_IDLE state, if a user operation is detected, the UE needs to reestablish an RRC connection to the first network, and switches from the RRC_IDLE state to the RRC_CONNECT state, which is slow.

It should be noted that the cell B and the cell A may be the same or different. If the cell B and the cell A are the same, the UE directly stays in the RRC_INACTIVE state based on the first UE context. If the cell B and the cell A are different but the cell B and the cell A belong to a same RNA, the UE can still stay in the RRC_INACTIVE state based on the first UE context. If the cell B and the cell A are different and the cell B and the cell A do not belong to a same RNA, the UE needs to initiate an RNA update (RNA Update, RNAU) procedure, so that the cell B obtains the UE context from the cell A and updates a data forwarding path. After the RNA update procedure is completed, an access network device corresponding to the cell B sends release signaling with a suspend configuration to the UE, indicating the UE to enter the RRC_INACTIVE state. In addition, the UE updates, based on the suspend configuration, a parameter configuration related to the RRC inactive state, including RNA configuration information. In this case, the UE stores a UE context (denoted as a second UE context) obtained after RNA update. After that, the UE can stay in the RRC_INACTIVE state based on the second UE context. Optionally, the UE deletes the first UE context.

S306. If the UE selects to camp on a cell C of a second network and then camps on a cell D of the first network, the UE stays in the RRC_INACTIVE state of the first network based on the first UE context.

In the conventional art, if the UE finds the cell C of the second network meeting the camping condition, and selects to camp on the cell C, the UE deletes the first UE context and switches from the RRC_INACTIVE state of the first network to an RRC_IDLE state of the second network. However, in some embodiments of this application, after the UE camps on the cell C, the UE does not delete the first UE context (that is, keeps the first UE context), and stays in the RRC_INACTIVE state of the first network based on the first UE context. It should be noted that at this time, the state of the UE recorded by the first network is still the RRC_INACTIVE state of the first network.

In some examples, the UE initiates a registration procedure to the cell C after camping on the cell C. If the UE successfully registers with the cell C of the second network, the UE deletes the first UE context and switches from the RRC_INACTIVE state of the first network to the RRC_IDLE state of the second network. After that, when data is transmitted between the UE and the second network, the UE can switch from the RRC_IDLE state of the second network to an RRC_CONNECT state of the second network.

In some other examples, if the UE does not initiate the registration procedure in the cell C after camping on the cell C or if the UE initiates the registration procedure but fails in registration, the UE camps on the first network again (for example, camps on the cell D of the first network), and the UE can still stay in the RRC_INACTIVE state of the first network based on the first UE context. The cell D and the cell A may be the same or different. Likewise, if the cell D and the cell A are the same, or if the cell D and the cell A are different but the cell D and the cell A belong to the same RNA, the UE can still stay in the RRC_INACTIVE state based on the first UE context. If the cell D and the cell A are different and the cell D and the cell A do not belong to a same RNA, the UE needs to initiate an RNA update (RNA Update, RNAU) procedure. Before the RNAU procedure is completed, the UE stays in the RRC_INACTIVE state based on the first UE context. After the RNAU procedure is completed, the UE updates the RNA and generates a new UE context. The UE can stay in the RRC_INACTIVE state based on the new UE context. Optionally, the UE deletes the first UE context. It should be noted that in the conventional art, when the UE camps on the second network, the UE is in the RRC_IDLE state of the second network. When the UE switches from the second network to the first network, the UE switches to the RRC_IDLE state of the first network.

It should be noted that, in some other embodiments, after the UE camps on the cell C, the UE does not delete the first UE context (that is, keeps the first UE context), and can first enter the RRC_INACTIVE state of the first network and then switch to the RRC_IDLE state of the second network. After the UE camps on the cell D of the first network again, the UE enters the RRC_INACTIVE state from the RRC_IDLE state based on the first UE context.

As described above, in the process in which the UE detaches from the network, camps on the second network, and then camps on the first network again, the UE stays in the RRC_INACTIVE state of the first network that is consistent with the state of the UE recorded by the first network. In this way, when the first network transmits downlink data and the first network performs paging by using RAN Paging, the UE can rapidly respond to the RAN Paging, to rapidly switch from the RRC_INACTIVE state to the RRC_CONNECT state, and receive the downlink data and send uplink data.

Figure 3B:
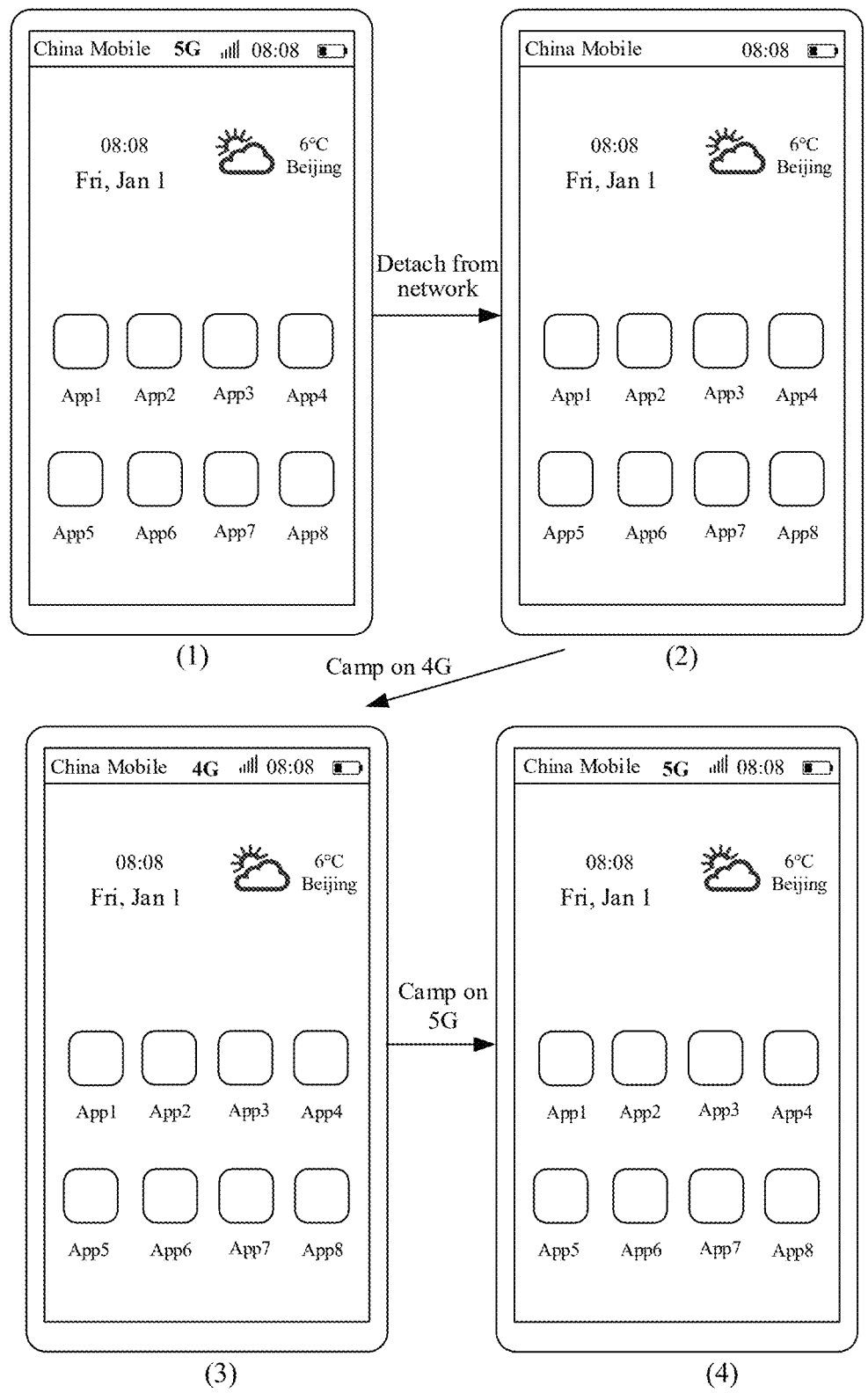
FIG. 3B is a schematic diagram of some graphical user interfaces of UE in the prior art.

In still some other embodiments, a graphical user interface of the UE can display an identifier of a network on which the UE currently camps. For example, a status bar in the graphical user interface of the UE displays the identifier of the network on which the UE currently camps. In the conventional art, when the UE camps on a 5G network (that is, the first network is a 5G network) and enters the RRC_INACTIVE state, the UE displays a screen (1) shown in FIG. 3B, and a status bar of the UE displays a "5G" identifier. If the UE detaches from the network, the UE displays a screen (2) shown in FIG. 3B, and the status bar of the UE does not display any network identifier. When the UE camps on a 4G network (that is, the second network is a 4G network), the UE displays a screen (3) shown in FIG. 3B, and the status bar of the UE displays a "4G" identifier. If the UE does not register with the 4G network successfully or does not initiate the registration to the 4G network, and camps on the 5G network again, the UE displays a screen (4) shown in FIG. 3B, and the status bar of the UE displays the "5G" identifier. The frequent change of the network identifier on the screen of the UE makes a user aware of high instability of the network, resulting in poor user experience.

Figure 3C:
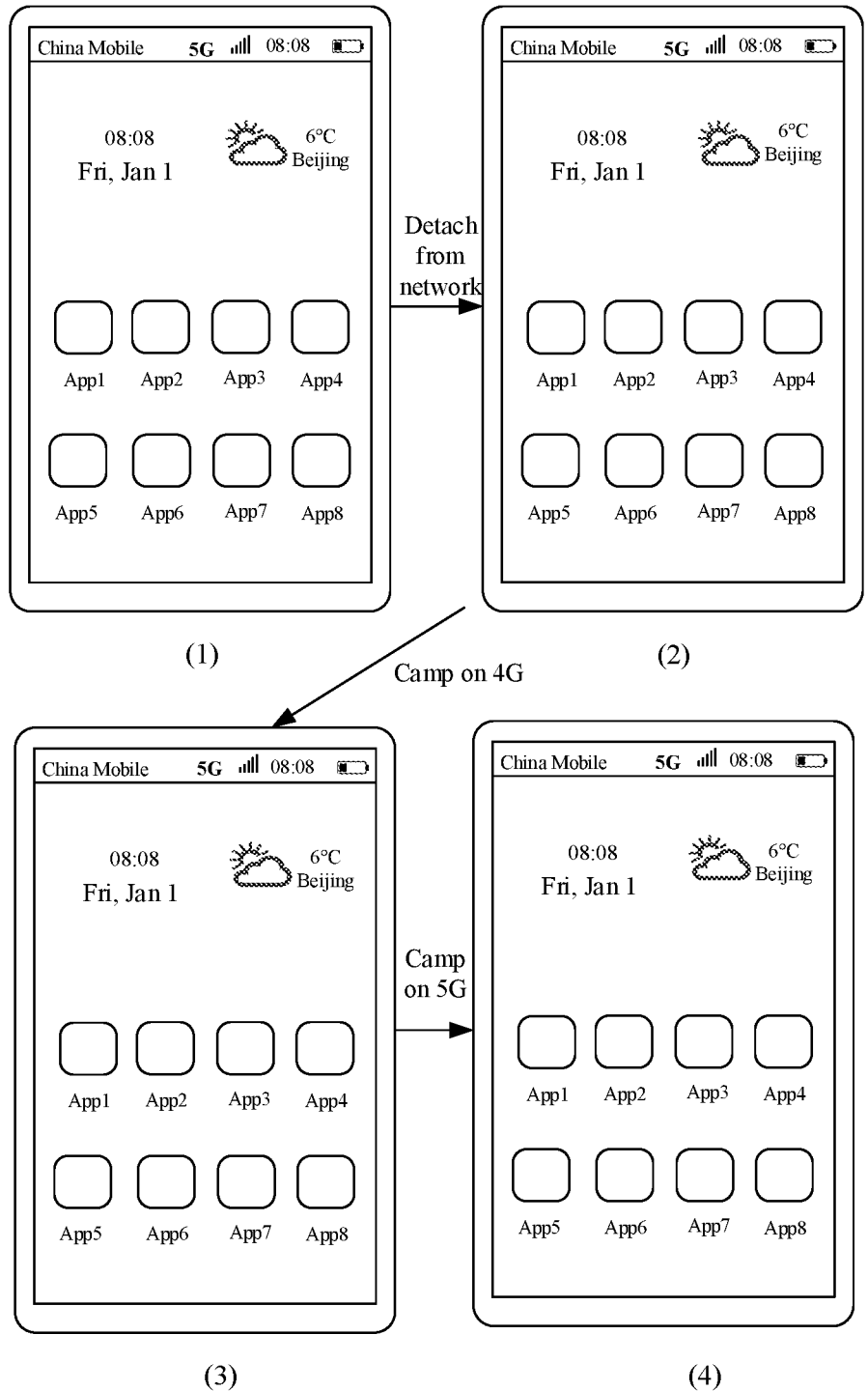
FIG. 3C is a schematic diagram of some graphical user interfaces of UE according to an embodiment of this application.

If the method in the embodiments of this application is used, when the UE camps on the 5G network (that is, the first network is a 5G network) and enters the RRC_INACTIVE state, the UE displays a screen (1) shown in FIG. 3C, and the status bar of the UE displays the "5G" identifier. If the UE detaches from the network, the UE still stays in the RRC_INACTIVE state of 5G, the UE can display a screen (2) shown in FIG. 3C, and the status bar displays the "5G" identifier, or the status bar of the UE does not display any network identifier. When the UE camps on the 4G network (that is, the second network is a 4G network), the UE still stays in the RRC_INACTIVE state of 5G and can display a screen (3) shown in FIG. 3C, and the status bar of the UE displays the "5G" identifier. If the UE does not register with the 4G network successfully or does not initiate the registration to the 4G network, and camps on the 5G network again, the UE displays a screen (4) shown in FIG. 3C, and the status bar of the UE displays the "5G" identifier. In this way, the network identifier displayed on the screen of the UE, namely the "5G" identifier, is scarcely changed, so that a user is unaware of instability of the network, thereby improving user experience.

In some other embodiments of this application, when the UE is in the RRC_INACTIVE state of the first network, if finding that the currently camping cell A of the first network meets a cell reselection condition, the UE performs a cell reselection procedure. That is, after step S303, step S307 and step S308 can be further performed.

S307. If the cell A meets cell reselection criteria, the UE performs cell reselection.

When the UE is in the RRC_INACTIVE state of the first network, the UE searches for a cell with higher signal quality according to the cell reselection criteria (cell reselection criteria). For example, based on priority information configured by the network side, the cell reselection criteria may cover the following three scenarios (a) to (c).

In the scenario (a), if a priority of a target cell is higher than a priority of a serving cell, conditions for triggering cell reselection are as follows:

(1) Within a preset time period, Srxlev of the target cell is greater than a first threshold; and (2) The UE camps on the serving cell for at least 1 second.

Srxlev represents a cell selection reception (reception, RX) level value, and the first threshold represents a threshold condition that Srxlev needs to meet when the UE reselects an RAT/frequency with a higher priority than a current serving frequency. For example, the first threshold may be represented as $Thresh_{X, High}$, in the unit of decibel (dB). Optionally, in the embodiments of this application, duration of the preset time period may be defined according to standards, and the preset time period may be represented as $Treselection_{RAT}$. The duration of the preset time period may vary in different cases. For example, the duration of the preset time period may vary in cases in which a candidate cell and a serving cell are intra-frequency and inter-frequency.

In the scenario (b), if a priority of the target cell is the same as a priority of the serving cell, a condition for triggering cell reselection is as follows:

Within the preset time period, for the target cell, RsRn is greater than Rs.

The cell reselection criteria in this scenario may be referred to as cell-ranking criteria (cell-ranking criteria), or R criteria for short. Rs and Rn represent cell-ranking criteria of the serving cell and cell-ranking criteria of the candidate cell, respectively. In an example, Rs and Rn may be represented by the following equations:

$$Rs = Q_{meas,s} + Q_{hyst} - Qoffset_{temp} \quad (1)$$

$$Rn = Q_{meas,n} - Qoffset - Qoffset_{temp} \quad (2)$$

$Q_{meas,s}$ and $Q_{meas,n}$ represent measurement quality of reference signal received power (reference signal receiving power, RSRP) used by the serving cell and the candidate cell during cell selection, respectively, $Q_{hyst}$ represents a hysteresis value of the cell-ranking criteria, Qoffset represents an offset of a cell, and $Qoffset_{temp}$ represents an offset temporarily applied to the cell. Optionally, the parameters used in the equation (1) and the equation (2) may be obtained from system messages.

In the scenario (c), if a priority of the target cell is lower than a priority of the serving cell, conditions for triggering cell reselection are as follows:

(1) Within the preset time period, Srxlev of the target cell is greater than a second threshold, and Srxlev of the serving cell is less than a third threshold; and (2) The UE camps on the serving cell for at least 1 second.

Srxlev represents a cell selection RX level value, and the second threshold and the third threshold represent threshold conditions that Srxlev of the target cell and Srxlev of the serving cell need to meet when the UE reselects an RAT/frequency with a lower priority than a current serving frequency. For example, the second threshold may be represented as $Thresh_{Serving,LowP}$, and the third threshold may be represented as $Thresh_{X, LowP}$, in the unit of dB. Optionally, in the embodiments of this application, duration of the preset time period may be defined according to standards, and the preset time period may be represented as $Treselection_{RAT}$. The duration of the preset time period may vary in different cases. For example, the duration of the preset time period may vary in cases in which a candidate cell and a serving cell are intra-frequency and inter-frequency.

Optionally, the cell reselection criteria are not limited to the foregoing examples, and several conditions may also be added or deleted based on the cell reselection criteria in the foregoing examples. Optionally, in the scenario (a) and the scenario (c), Squal may replace Srxlev to serve as a condition for determining cell reselection.

S308. If the UE reselects a cell E of the second network and then reselects a cell F of the first network, the UE stays in the RRC_INACTIVE state based on the first UE context.

In the conventional art, if the UE reselects the cell E of the second network, the UE deletes the first UE context and switches from the RRC_INACTIVE state of the first network to the RRC_IDLE state of the second network. However, in some embodiments of this application, after the UE camps on the cell E, the UE does not delete the first UE context (that is, keeps the first UE context), and stays in the RRC_INACTIVE state of the first network based on the first UE context.

After that, the UE initiates a registration procedure to the cell E of the second network. If the UE successfully registers with the second network, the UE switches from the RRC_INACTIVE state of the first network to the RRC_IDLE state of the second network. That is, in the embodiments of this application, from the execution of the cell reselection procedure on the first network till the successful registration with the second network, the UE stays in the RRC_INACTIVE state of the first network.

In some other examples, if the UE reselects a cell (that is, a cell F) of the first network before initiating the registration procedure to the second network, or if the UE does not register with the second network successfully and reselects the cell F of the first network, the UE still stays in the RRC_INACTIVE state of the first network based on the first UE context. It should be noted that in the conventional art, when the UE camps on the second network, the UE is in the RRC_IDLE state of the second network. When the UE switches from the second network to the first network, the UE switches to the RRC_IDLE state of the first network. The cell F and the cell A may be the same or different. For other content, refer to related description of the cell B. Details are not described herein again.

In addition, for the graphical user interfaces of the UE in this case, refer to the foregoing description given when the UE detaches from the network, camps on the second network, and then camps on the first network again. Details are not described herein again.

It should be noted that, in some other embodiments, when the UE reselects the cell E of the second network, the UE does not delete the first UE context (that is, keeps the first UE context), and can enter the RRC_IDLE state of the second network. After the UE reselects the cell F of the first network, the UE can enter the RRC_INACTIVE state from the RRC_IDLE state based on the first UE context.

Therefore, when the UE first reselects the second network and then reselects the first network, the UE stays in the RRC_INACTIVE state of the first network that is consistent with the state of the UE recorded by the first network. In this way, when the first network transmits downlink data and the first network performs paging by using RAN Paging, the UE can rapidly respond to the RAN Paging, to rapidly switch from the RRC_INACTIVE state to the RRC_CONNECT state, and receive the downlink data and send uplink data.

The foregoing examples describe in detail the scenarios in which the UE stays in the RRC_INACTIVE state of the first network. The following examples describe scenarios in which the UE switches from the RRC_INACTIVE state of the first network to another state.

In some scenarios, when the UE needs to send uplink data to the first network, the UE can actively enter the RRC_CONNECT state from the RRC_INACTIVE state to resume an RRC connection. Alternatively, when needing to send downlink data to the UE, the first network can page the UE by using RAN Paging, to resume an RRC connection, and the UE enters the RRC_CONNECT state from the RRC_INACTIVE state.

Figure 4:
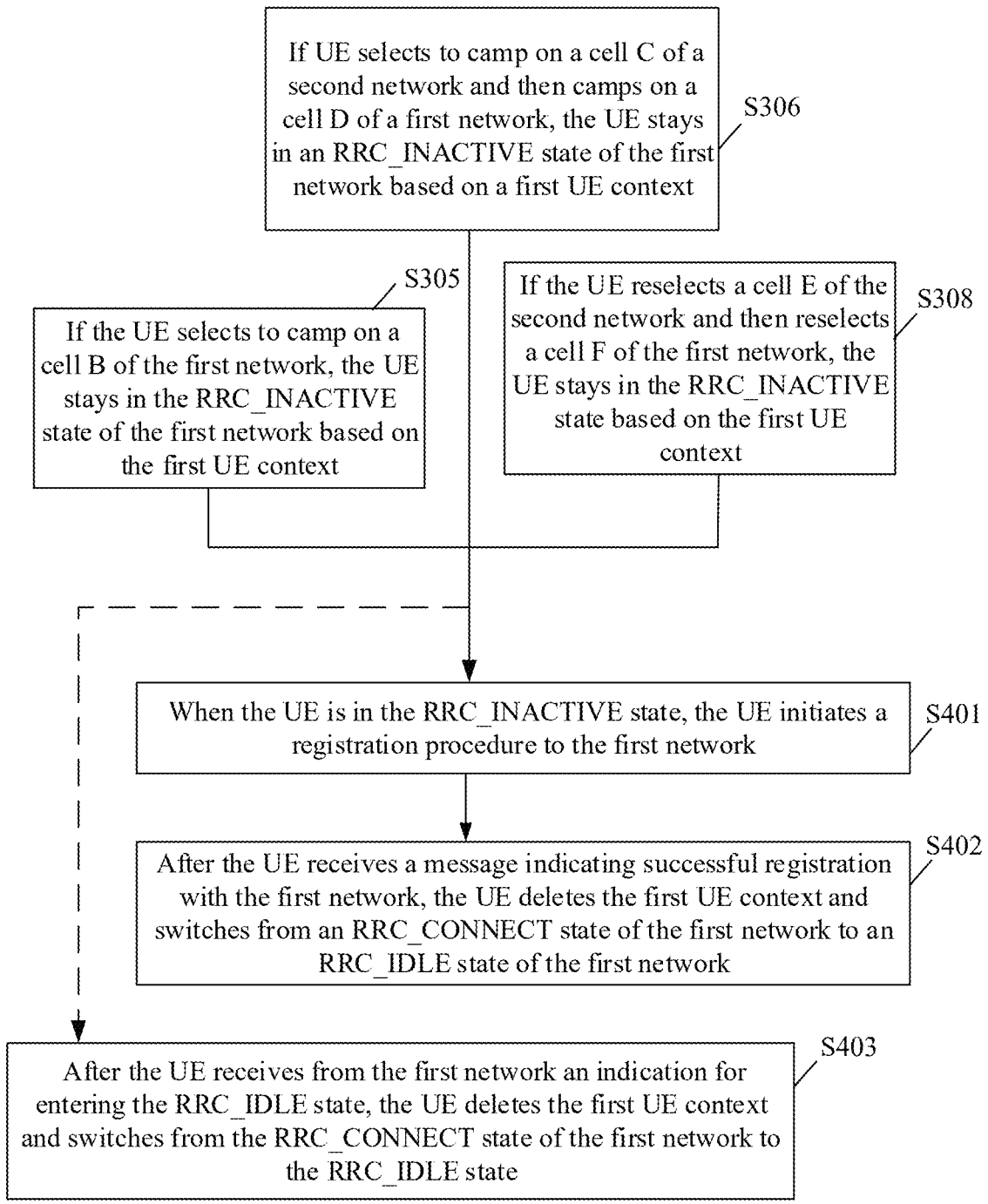
FIG. 4 is a schematic flowchart of UE paging in the prior art.

In some other scenarios, after the UE detaches from the network and camps on the first network again, or after the UE reselects the second network but does not register with the second network or does not succeed in registration and camps on the first network again, the UE stays in the RRC_CONNECT state of the first network. FIG. 4 is a flowchart of another method for increasing a paging response speed of UE according to an embodiment of this application. In this embodiments of this application, after step S305 or step S306 or step S308, step S401 and step S402, or step S403 are further performed. The steps are specifically as follows.

S401. When UE is in an RRC_INACTIVE state, the UE initiates a registration procedure to a first network.

S402. After the UE receives a message indicating successful registration with the first network, the UE deletes a first UE context and switches from an RRC_CONNECT state of the first network to an RRC_IDLE state of the first network.

In some embodiments, when the UE is in the RRC_INACTIVE state in the first network, if a location of a cell on which the UE camps is changed (for example, a TA in which the UE is located is changed), the UE initiates a location update registration procedure to the first network. Alternatively, the UE periodically initiates the location update registration procedure. Alternatively, when a capability of the UE is changed or a user operates the UE (for example, the user turns off and then restarts the UE, or the user enables an aeroplane mode and then disables the aeroplane mode), the UE initiates a registration procedure to the first network again. After the UE registers with the first network again successfully, the UE deletes the first UE context (or a second UE context) and switches from the RRC_CONNECT state to the RRC_IDLE state.

S403. After the UE receives an indication of the first network for entering the RRC_IDLE state, the UE deletes the first UE context and switches from the RRC_CONNECT state of the first network to the RRC_IDLE state.

In still some other embodiments, when the UE is in the RRC_INACTIVE state in the first network and no data is transmitted between the UE and the first network within a second preset time duration, the first network releases an NG connection between the UE and a core network side, and sends to the UE an indication for entering the RRC_IDLE state (for example, release signaling or CN Paging signaling). After the UE receives an indication for entering the RRC_IDLE state, the UE deletes the first UE context (or the second UE context) and switches from the RRC_INACTIVE state to the RRC_IDLE state.

In other words, after the UE enters the RRC_INACTIVE state, even the UE detaches from the network or the UE performs reselection, the UE stays in the RRC_INACTIVE state. The UE switches from the RRC_INACTIVE state to the RRC_CONNECT state only after the UE registers with the first network again successfully. Compared with the conventional art, the embodiments of this application prolong the time during which the UE is in the RRC_INACTIVE state in the scenario of detach from the network or reselection, reduce slow response to paging of the network caused by inconsistency between the actual state of the UE and the state of the UE recorded by the network side, and increase a response speed of the UE to paging of the network side.

Figure 5:
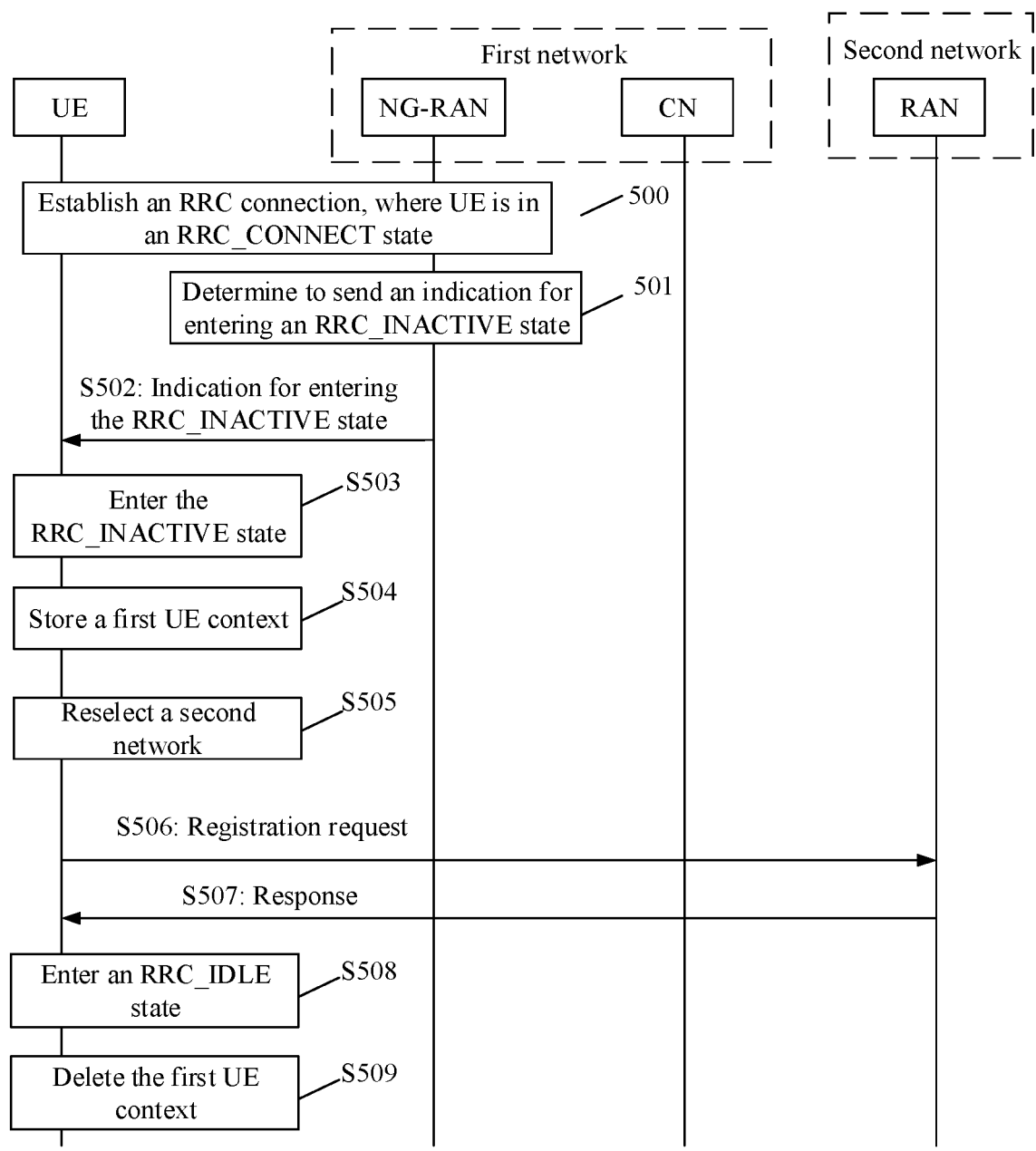
FIG. 5 is a schematic flowchart of another method for increasing a paging response speed of UE according to an embodiment of this application.

In still some other scenarios, it can be learned from the foregoing descriptions that after the UE detaches from the network or reselects a cell and camps on another network, for example, the second network, the UE can initiate a registration procedure to the second network to establish a connection between the UE and the second network. FIG. 5 is a flowchart of another method for increasing a paging response speed of UE according to an embodiment of this application. The method specifically includes the following steps.

S500. UE establishes an RRC connection to a first network. In this case, the UE is in an RRC_CONNECT state, and a state of the UE recorded by the first network is the RRC_CONNECT state. The first network is, for example, a 5G network.

S501. The first network determines to indicate the UE to enter the RRC_INACTIVE state.

When no data is transmitted between the UE and the first network within a first preset time period, the first network (which may specifically be, for example, a gNB) determines to indicate the UE to enter the RRC_INACTIVE state.

S502. The first network sends, to the UE, an indication for entering the RRC_INACTIVE state, for example, RrcConnRelsese (Suspend) signaling.

S503. The UE enters the RRC_INACTIVE state.

In addition, the state of the UE recorded by the first network is the RRC_INACTIVE state.

S504. The UE stores a first UE context.

S505. The UE reselects a second network.

S506. The UE sends a registration request to the second network, for example, Tau_Request signaling.

For example, the first network is a 5G network, and an access network device of the first network is a gNB. The second network is an LTE network, and an access network device of the second network is an eNB.

S507. The second network registers the UE and returns a registration success response to the UE, for example, TAU_ACP signaling.

S508. The UE enters an RRC_IDLE state.

S509. The UE deletes the first UE context.

In other words, after the UE enters the RRC_INACTIVE state, even the UE detaches from the network or the UE performs reselection, the UE stays in the RRC_INACTIVE state. The UE switches from the RRC_INACTIVE state of the first network to the RRC_IDLE state of the second network only after the UE registers with the second network successfully. When the UE is triggered by a service on the second network, the UE switches from the RRC_IDLE state to the RRC_CONNECT state. Compared with the conventional art, the embodiments of this application prolong the time during which the UE is in the RRC_INACTIVE state in the scenario of detach from the network or reselection, reduce slow response to paging of the network caused by inconsistency between the actual state of the UE and the state of the UE recorded by the network side, and increase a response speed of the UE to paging of the network side.

Figure 6:
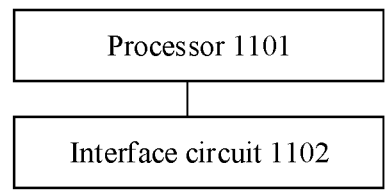
FIG. 6 is a schematic structural diagram of a system on chip according to an embodiment of this application.

An embodiment of this application further provides a system on chip. As shown in FIG. 6, the system on chip includes at least one processor 1101 and at least one interface circuit 1102. The processor 1101 and the interface circuit 1102 can be interconnected by using a circuit. For example, the interface circuit 1102 can be configured to receive a signal from another apparatus (for example, the memory of the UE 100). For another example, the interface circuit 1102 can be configured to transmit a signal to another apparatus (for example, the processor 1101). For example, the interface circuit 1102 can read an instruction stored in the memory and send the instruction to the processor 1101. When the instruction is executed by the processor 1101, the UE can be caused to perform the steps performed by the UE 100 (for example, a mobile phone) in the foregoing embodiments. Certainly, the system on chip may further include other discrete devices. This is not specifically limited in the embodiments of this application.

An embodiment of this application further provides an apparatus, where the apparatus is included in UE, and the apparatus has a function of implementing behavior of the UE in any method in the foregoing embodiments. Such function may be implemented by hardware or corresponding software executed by hardware. The hardware or software includes at least one module or unit corresponding to the foregoing function, for example, a communications module or unit, a determining module or unit, and a switching module or unit.

An embodiment of this application further provides a computer-readable storage medium, including a computer instruction, where when the computer instruction runs on UE, the UE is caused to perform any method in the foregoing embodiments.

An embodiment of this application further provides a computer program product, where when the computer program product runs on a computer, the computer is caused to perform any method in the foregoing embodiments.

An embodiment of this application further provides a graphical user interface on UE, where the UE includes a display, a camera lens, a memory, and one or more processors, the one or more processors are configured to execute one or more computer programs stored in the memory, and the graphical user interface includes the graphical user interface displayed when the UE performs any method in the foregoing embodiments.

It can be understood that to implement the foregoing functions, the terminal or the like includes corresponding hardware structures and/or software modules for implementing all the functions. A person skilled in the art should be very easily aware that units and algorithm steps in the examples described with reference to the embodiments disclosed in this specification can be implemented by hardware or a combination of hardware and computer software in the embodiments of this application. Whether the functions are performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, division of functional modules may be performed for the terminal device and the like based on the foregoing method examples. For example, functional modules may be obtained through division in one-to-one correspondence with functions, or two or more functions may be integrated into one processing module. The integrated module may be implemented in a form of hardware, or may be implemented in a form of a software functional module. It should be noted that the division of the modules in the embodiments of the present invention is an example and is merely logical function division. There may be another division manner in actual implementation.

Through description of the foregoing implementations, it can be clearly understood by a person skilled in the art that for convenient and brief description, the foregoing merely describes an example of the division of the functional modules. In actual application, the functions can be allocated to different functional modules as desired, that is, an internal structure of the apparatus is divided into different functional modules, to complete all or some functions described above. For detailed operating processes of the systems, apparatuses, and units in the foregoing descriptions, refer to corresponding processes in the foregoing method embodiments. Details are not described herein again.

The functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When implemented in a form of a software functional unit and sold or used as an independent product, the integrated unit may be stored in a computer-readable storage medium. Based on such understanding, the essential part or the part, contributing to the prior art, of the technical solutions of the embodiments of this application, or all or some of the technical solutions may be implemented in a form of a software product. The computer software product is stored in a storage medium, and includes several instructions for causing a computer device (for example, a personal computer, a server, or a network device) or a processor to perform all or some of the steps of the foregoing method in the embodiments of this application. The foregoing storage medium includes: any medium capable of storing program code, such as a flash memory, a removable hard disk, a read-only memory, a random access memory, a magnetic disk, or an optical disc.

The foregoing merely describes the particular embodiments of this application, but are not intended to limit the protection scope of this application. Any variation or replacement within the technical scope disclosed by this application should fall within the protection scope of this application. Therefore, the protection scope of this application shall be subject to the protection scope of the claims.

What is claimed is:

1. A method for increasing a paging response speed of user equipment (UE), comprising:
   camping, by the UE, on a first cell of a first network, wherein the UE is in a Radio Resource Control (RRC) connected state;
   in response to an indication for switching to an RRC inactive state that is received from an access network device, entering, by the UE, the RRC inactive state; and
   when a preset condition is met, detecting a second cell of the first network that meets a camping condition and camping, by the UE, on the second cell of the first network, wherein the UE stays in an RRC inactive state, and the first cell and the second cell are different;
   wherein the preset condition comprises: the UE is powered off and then restarted, or the UE enables an airplane mode and then disables the airplane mode.

2. The method according to claim 1, wherein the camping, by the UE, on the second cell of the first network when the preset condition is met, wherein the UE is in the RRC inactive state, comprises:

after the preset condition is met, camping, by the UE, first on a third cell of a second network, and then on the second cell of the first network, wherein the UE is in the RRC inactive state.

3. The method according to claim 1, wherein the camping, by the UE, on the second cell of the first network when the preset condition is met, wherein the UE is in the RRC inactive state, further comprises:
  when the UE determines that a signal of the first cell meets cell reselection criteria, reselecting, by the UE, a third cell of a second network first and then the second cell of the first network, wherein the UE is in the RRC inactive state, and a network type of the second network is different from a network type of the first network.

4. The method according to claim 1, wherein the camping, by the UE, on the second cell of the first network when the preset condition is met, wherein the UE is in the RRC inactive state, comprises:
  when the preset condition is met, camping, by the UE, on the second cell of the first network, wherein the UE does not enter an RRC idle state; or
  when the preset condition is met, camping, by the UE, on the second cell of the first network, and entering the RRC idle state and then the RRC inactive state.

5. The method according to claim 1, wherein after the camping, by the UE, on the second cell of the first network, wherein the UE is in the RRC inactive state, the method further comprises:
  in response to first RAN paging that is sent by an access network device and that is received by the UE, resuming, by the UE, an RRC connection to the access network device, and switching from the RRC inactive state to the RRC connected state.

6. The method according to claim 1, wherein the method further comprises:
  when the UE camps on the second cell of the first network and the UE is in the RRC inactive state, sending, by the UE, a registration request to the access network device; and
  in response to a registration success response that is received from the access network device, deleting, by the UE, a UE context of the UE in the RRC inactive state, and entering the RRC idle state.

7. The method according to claim 1, wherein the method further comprises:
  when the UE camps on the second cell of the first network and the UE is in the RRC inactive state, receiving, by the UE, a second message that is sent by the access network device, wherein the second message is used to indicate to the UE to enter the RRC idle state; and deleting, by the UE, the UE context of the UE in the RRC inactive state, and switching to the RRC idle state.

8. The method according to claim 7, wherein an indication for entering the RRC idle state comprises release signaling and core network paging, wherein the release signaling does not comprise a suspend configuration.

9. The method according to claim 1, wherein the method further comprises:
  when the UE camps on the second cell of the first network and the UE is in the RRC inactive state, receiving, by the UE, a user operation; sending, by the UE, an RRC connection resume request to the access network device; switching, by the UE, from the RRC inactive state to the RRC connected state; and sending, by the UE, uplink data to the access network device.

10. A UE (user equipment), comprising a processor and a memory, wherein the memory is coupled to the processor, the memory is configured to store computer program codes, the computer program codes comprise computer instructions, wherein when the computer instructions are executed the processor reads the computer instructions from the memory, the UE is caused to perform operations of the UE according to claim 1.

11. A non-transitory computer-readable storage medium, comprising computer instructions, wherein when the computer instructions are executed on an electronic device, the electronic device is caused to perform the method for increasing the paging response speed of the UE according to claim 1.

12. A system on chip, comprising one or more processors, wherein when instructions are executed by the one or more processors, the one or more processors perform the method for increasing a paging response speed of the UE according to claim 1.

* * * * *